United States Patent Office 2,987,437
Patented June 6, 1961

2,987,437
NEMATOCIDAL COMPOSITION

Frederick A. Hessel, Montclair, N.J., assignor to General Aniline & Film Corporation, New York, N.Y., a corporation of Delaware No Drawing. Filed Mar. 6, 1958, Ser. No. 719,518

6 Claims. (Cl. 167—33)

The present invention relates to an improved nematocidal composition and to a process of applying the same.

It has been established that 3,4-dichlorotetrahydrothiophene-1,1-dioxide merits further trial tests for the control of nematodes in view of the promising results obtained by laboratory, greenhouse and small plot tests. This compound, which is commercially available, is a white crystalline solid with a very low vapor and is essentially odorless. Its chemical formula and other properties are as follows:

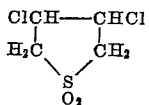

Melting point ............... 129-131° C.
Boiling point ............... 186° C. at 10 mm. Hg.
Thermal stability ........... M.P. unchanged after 2 hours at 200° C.

| | 20° C. | 25° C. | 30.5° C. |
|---|---|---|---|
| Solubility in water (gms./100 ml. solution) | 0.22 | 0.27 | 0.35 |

To apply the foregoing crystalline solid in the practical customary way, i.e. in solution, it has been found that its solubility in various organic solvents is very limited with the exception of acetone. The following illustrates the highest solubility in organic solvents at 30° C.:

| Solvent | Grams/100 ml. of Solution |
|---|---|
| Acetone | 40.6 |
| Methyl ethyl ketone | 38.5 |
| Cyclohexanone | 25.2 |
| Chloroform | 8.0 |
| Velsicol AR 50 (An isoparaffinic petroleum liquid hydrocarbon) | 3.1 |

Acetone is impractical since it is a highly flammable liquid and the vapors of which if inhaled beyond 500 p.p.m. can produce dyspepsia. Methyl ethyl ketone is likewise a flammable liquid. The vapors of cyclohexane, which is an oily liquid, are also harmful to warm blooded animals and man. The use of chloroform would be out of the question in view of its toxic character and the production of burns if left in contact with the skin.

It is an object of the present invention to provide an improved nematocidal composition which may be readily applied in liquid form in the control and eradication of nematodes.

A further object is to provide a method of applying 3,4-dichlorotetrahydrothiophene-1,1-dioxide in a non-inflammable relatively non-toxic liquid medium so as to allow easier handling and application in the treatment and control of nematodes.

Other objects and advantages will become more readily apparent from the following description.

I have found that liquid compounds having the following general formula:

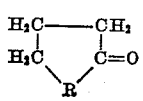

wherein R represents either oxygen or an imino group, are excellent solvent-diluents for the 3,4-dichlorotetrahydrothiophene-1,1-dioxide and that the resulting solute-solvent combination displays a synergistic effect.

The compounds contemplated by the foregoing general formula are γ-butyrolactone (boiling point 204° C.) and 2-pyrrolidone (boiling point 245° C.). They are neither inflammable nor primary irritants or skin sensitizers and as a result have substantially no toxicity to most plants and mammals. When either one of these compounds is employed as a solvent-diluent for the 3,4-dichlorotetrahydrothiophene-1,1-dioxide, it displays little or no phytotoxic properties with the exception of some broad leafed weeds.

The 3,4-dichlorotetrahydrothiophene-1,1-dioxide is soluble in the extent of 40-50 parts by weight of either γ-butyrolactone or 2-pyrrolidone. This unusual solubility characteristic permits the employment of substantially reduced amounts of the 3,4-dichlorotetrahydrothiophene-1,1-dioxide to small areas. All that is required in such case is to dissolve 40-50 parts by weight of the 3,4-dichlorotetrahydrothiophene-1,1-dioxide in 50-60 parts by weight of either the γ-butyrolactone or 2-pyrrolidone and dilute the resulting mixture with an additional amount of the same solvent-diluent. Inasmuch as the γ-butyrolactone and the 2-pyrrolidone have nematocidal properties of their own, a synergistic effect is obtained when either one is used in combination with the 3,4-dichlorotetrahydrothiophene-1,1-dioxide.

The following example will illustrate the lack of phytotoxicity of the solvent-diluents. All parts are percent by weight.

EXAMPLE I

| Compound | Percent | Two-week Old Seedlings |||
|---|---|---|---|---|
| | | Bean | Tomato | Corn |
| | | Growth Suppression |||
| 2-pyrrolidone | 0.1 | none | none | none. |
| γ-butyrolactone | 0.1 | none | none | none. |
| blank | | none | none | none. |

EXAMPLE II

In order to determine the systemic toxicity of the solvent-diluents, the following evaluation method by soil application was employed:

Test plants ............... Wheat, soybeans, and a weed seed mixture.
Age of plants ............ Seedlings; when soybeans are developing second trifoliate leaves.
Container ................ Grown in 4" clay pots.
Planting method .......... Plant 5 soybeans and 15 wheat seeds to give fine uniform plants of each species at the time of treatment. Scatter ¼ teaspoon of weed seed mixture on soil surface after planting.
Formulation of chemical .. Apply 45 ml. of a 0.1% solution to the surface of one 4" pot (50 lbs. per acre).
Environment control ...... Standard greenhouse conditions; water as needed.
Duration of test ......... About three weeks.

Test

| Product | Percent | Crop || Weeds ||
|---|---|---|---|---|---|
| | | Wheat | Soybean | Grasses | Broadleave |
| | | Growth Suppression ||||
| 2-pyrrolidone | 0.1 | Slight | moderate | slight | severe. |
| γ-butyrolactone | 0.1 | none | slight | slight | slight. |
| blank | | none | none | none | none. |

As noted above, the γ-butyrolactone and the 2-pyrrolidone are readily soluble in water. Contrary to what has been expected, solutions of the aforementioned nematocidal agents made in either γ-butyrolactone or 2-pyrrolidone, can be diluted to some extent with water without any precipitation or formation of the two phases.

*Example III*

In order to determine the effectiveness of the 3,4-dichlorotetrahydrothiophene-1,1-dioxide as a nematocidal agent alone, the solvent alone and the solvent-solute mixture, the following procedure was employed:

Duplicate 100 gram samples of dry sand were mixed with 5 gram samples of a brei of tomato roots infested with root-knot nematodes, *Meloidogyne incognita*. The brei was prepared by cutting tomato roots of infested plants into quarter inch lengths, then further macerating in a Waring Blendor for 1 minute. The sand and the brei were mechanically mixed by shaking 1 minute in a closed Mason jar. The mixture was transferred to 2½ in ch clay pots at which time a certain number of milligrams of test compound was added to the mixture. Each pot was then wrapped in Saran and allowed to stand for 24 hours.

The mixture was then transferred to stainless steel cylinder screens, approximately 2½ inches high and 3½ inches in diameter. The screen material was 100 mesh stainless steel wire cloth. These screens were placed in the bottom half of a 9 cm. Petri containing 25 ml. of water and covered with the Petri dish cover. In a short time an additional 10 ml. of distilled water were added to each plate in order that free water would be available in the dish. After 24 hours microscopic counts of ten fields were made of the living nematodes which had migrated through the screen and into the Petri dish. Comparisons were made with untreated control dishes and the results obtained are as follows:

| Compounds | Rate in Milligrams | Fields | Average Nematode Count, Living | Average Nematode Count, Dead |
|---|---|---|---|---|
| γ-butyrolactone | 50 | 10 | 19 | 131 |
| 2-pyrrolidone | 50 | 10 | 42 | 109 |
| blank | 0 | 10 | 148 | 3 |
| 3,4-dichlorotetrahydrothiophene-1,1-dioxide [1] | 50 | 10 | 15 | 136 |
| 40% solution by weight of 3,4-dichlorotetrahydrothiophene-1,1-dioxide in γ-butyrolactone | 20 | 10 | 6 | 153 |
| 40% solution by weight of 3,4-dichlorotetrahydrothiophene-1,1-dioxide in 2-pyrrolidone | 20 | 10 | 8 | 151 |

[1] The product was first dissolved in a small quantity of acetone and the resulting solution emulsified to yield an aqueous emulsion. A sufficient quantity of the emulsion was taken which would contain 50 milligrams of the nematocidal compound.

In addition to the γ-butyrolactone and 2-pyrrolidone, I have also found that N-methyl-2-pyrrolidone is the most effective solvent-diluent for the 3,4-dichlorotetrahydrothiophene-1,1-dioxide. As much as 60% by weight of the latter can be dissolved in the N-methyl-2-pyrrolidone. The resulting solvent-solute combination however, does not display a synergistic effect. This is evidently due to the fact that the N-methyl-2-pyrrolidone does not possess any nematocidal activity. Despite this shortcoming, the N-methyl-2-pyrrolidone may be employed as a very efficient non-toxic, non-inflammable solvent-diluent for the 3,4 - dichlorotetrahydrothiophene-1,1-dioxide to yield a satisfactory solvent-solute combination very effective as a nematocide.

I claim:

1. A liquid nematocidal composition comprising 40 parts by weight of 3,4-dichlorotetrahydrothiophene-1,1-dioxide and 60 parts by weight of a compound selected from the group consisting of γ-butyrolactone and 2-pyrrolidone.

2. A liquid nematocidal composition comprising 40 parts by weight of 3,4-dichlorotetrahydrothiophene-1,1-dioxide and 60 parts by weight of γ-butyrolactone.

3. A liquid nematocidal composition comprising 40 parts by weight of 3,4-dichlorotetrahydrothiophene-1,1-dioxide and 60 parts by weight of 2-pyrrolidone.

4. The method of controlling soil nematodes which comprises contacting said nematodes with a liquid nematocidal composition comprising 40 parts by weight of 3,4-dichlorotetrahydrothiophene-1,1-dioxide and 60 parts by weight of a compound selected from the group consisting of γ-butyrolactone and 2-pyrrolidone.

5. The method of controlling soil nematodes which comprises contacting said nematodes with a liquid nematocidal composition comprising 40 parts by weight of 3,4-dichlorotetrahydrothiophene-1,1-dioxide and 60 parts by weight of γ-butyrolactone.

6. The method of controlling soil nematodes which comprises contacting said nematodes with a liquid nematocidal composition comprising 40 parts by weight of 3,4-dichlorotetrahydrothiophene-1,1-dioxide and 60 parts by weight of 2-pyrrolidone.

References Cited in the file of this patent

UNITED STATES PATENTS

| | | |
|---|---|---|
| 1,982,909 | Flint | Dec. 4, 1934 |
| 2,057,044 | Meisenburg | Oct. 13, 1936 |
| 2,377,446 | Payne | June 5, 1945 |
| 2,393,925 | Morris et al. | Jan. 29, 1946 |
| 2,419,073 | Hammer | Apr. 15, 1947 |
| 2,435,204 | Davidson | Feb. 3, 1948 |
| 2,473,984 | Bickerton | June 21, 1949 |
| 2,502,244 | Carter | Mar. 28, 1950 |
| 2,530,348 | Britton et al. | Nov. 14, 1950 |
| 2,543,580 | Kay | Feb. 27, 1951 |
| 2,714,619 | Anderegg et al. | Aug. 2, 1955 |
| 2,726,485 | Thomas | Dec. 13, 1955 |
| 2,730,547 | Dye | Jan. 10, 1956 |
| 2,743,209 | Jones | Apr. 24, 1956 |
| 2,770,638 | Giolito | Nov. 13, 1956 |
| 2,779,680 | Wolf | Jan. 29, 1957 |
| 2,794,727 | Barrows | June 4, 1957 |
| 2,802,021 | Heininger | Aug. 6, 1957 |
| 2,802,818 | Wheeler | Aug. 13, 1957 |
| 2,846,443 | Malusa et al. | Aug. 5, 1958 |

OTHER REFERENCES

Sollman: J. of Pharmacology and Exptl. Therapeutics, vol. XII, No. 3, pp. 129–170 (pp. 129–131 pert.), 1918.

Baldwin: Brit. J. Pharmacol., vol. 3, pp. 91–106 (pp. 91–93 pert.), 1948.

King: Chems. Evaluated as Insecticides, U.S. Dept. of Agr. Handbook No. 69, pp. 1–18 and 99, May 1954, also p. 325.

Chem. Abst. (I), vol. 24, p. 1156, (1930).

Chem Abst. (II), vol. 39, p. 4135 (1945).

Agr. and Food Chem., vol. 5, No. 10, p. 721, October 1957.

Haynes: Quarterly Reviews, vol. II, pp. 46–72, pp. 67–72 pert. (1948).

Scheflan et al.: The Handbook of Solvents, pp. 184 and 620, 1953.

Frear: A Catalogue of Insecticides and Fungicides, vol. I, p. 102, 1947.

Paranjope et al.: J. Univ. Bombay, vol. XIA, part 5, pp. 104–110, March 1943.